March 24, 1953     B. B. BELDEN ET AL     2,632,208
FEEDER MECHANISM
Filed March 9, 1950                             4 Sheets-Sheet 2
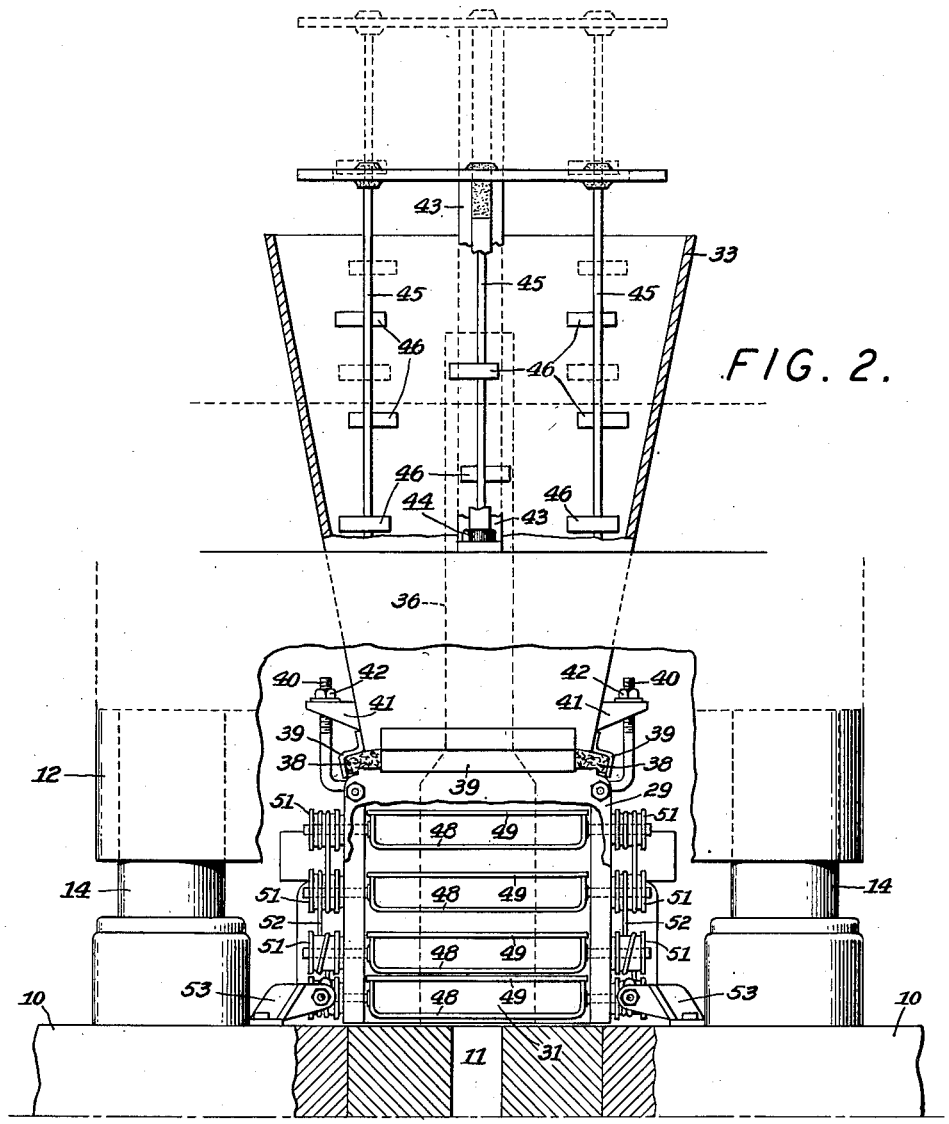
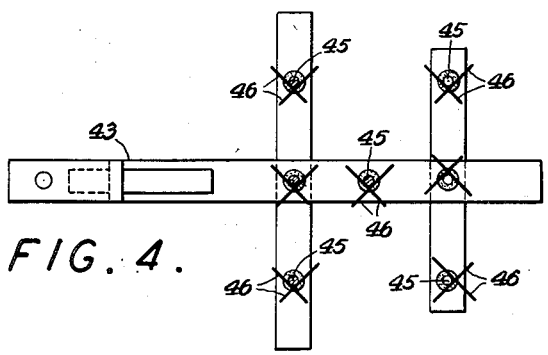
INVENTORS
BYRON B. BELDEN
KEITH W. HALL
BY
ATTORNEY March 24, 1953  B. B. BELDEN ET AL  2,632,208
FEEDER MECHANISM
Filed March 9, 1950  4 Sheets-Sheet 3
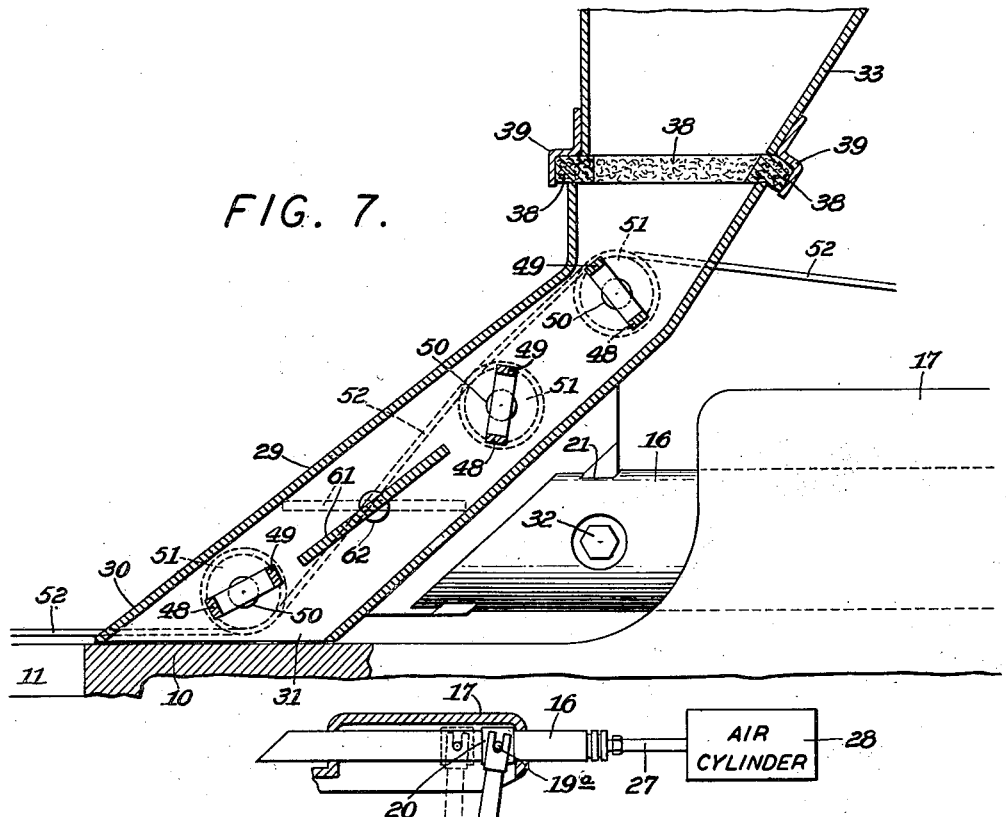
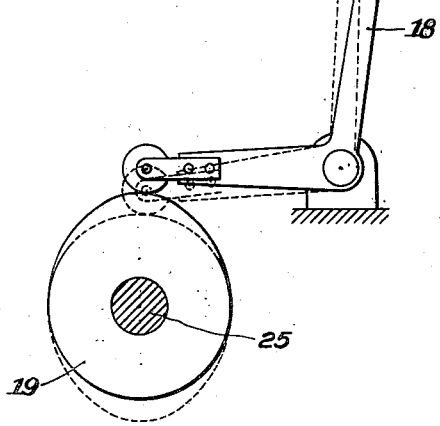
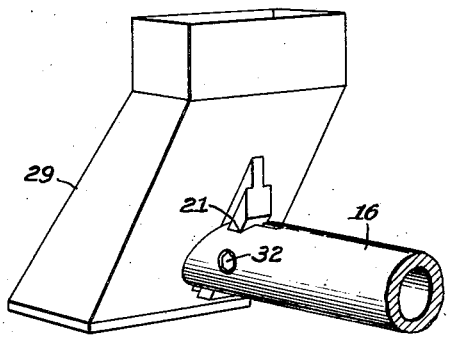
INVENTORS
BYRON B. BELDEN
KEITH W. HALL
BY
ATTORNEY March 24, 1953

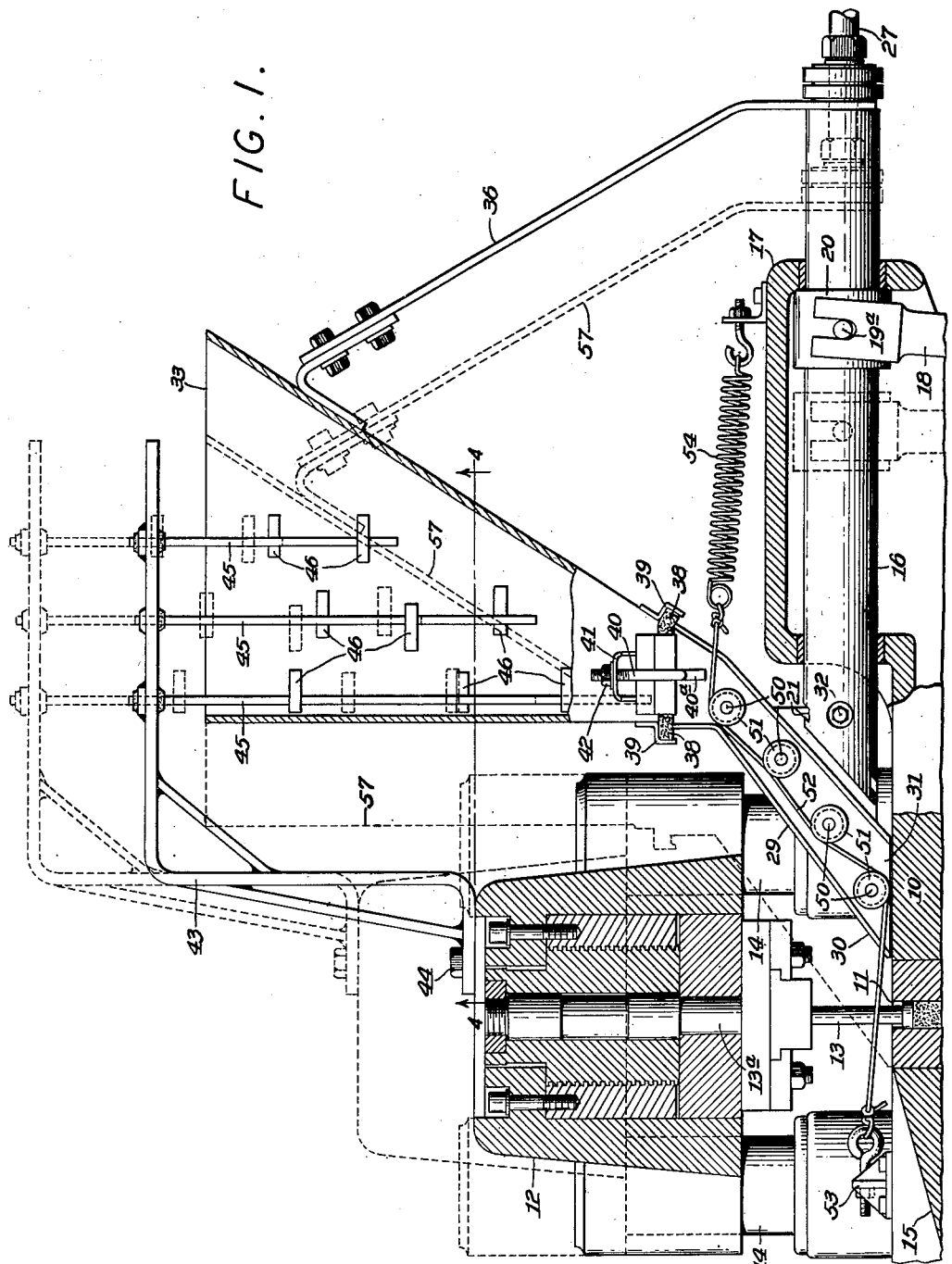

B. B. BELDEN ET AL 2,632,208

FEEDER MECHANISM

Filed March 9, 1950

INVENTORS
BYRON B. BELDEN
KEITH W. HALL
BY
ATTORNEY

Patented Mar. 24, 1953

2,632,208

UNITED STATES PATENT OFFICE 2,632,208

FEEDER MECHANISM

Byron B. Belden, Media, Pa., and Keith W. Hall, Ann Arbor, Mich., assignors to Baldwin-Lima-Hamilton Corporation, a corporation of Pennsylvania Application March 9, 1950, Serial No. 148,646

16 Claims. (Cl. 18—30)

This invention relates generally to material feeding equipment and more particularly to means for feeding loose materials in powder or other form to presses for tabletting, briquetting or preforming such materials.

While our improved feeder may have general application to loose materials of various kinds and forms, it is particularly useful for feeding powdered plastic material to preform presses, one example of which, among others, is disclosed in Patent No. 2,214,505. Heretofore it has been difficult, if not impossible, with conventional feeders, to make satisfactory tablets or preforms of fine powder plastic materials or of so-called medium impact materials with cotton flock filler for the reason that the material lumps and clogs in the hopper and chute, even though given a certain reciprocatory movement by the press, and therefore cannot be uniformly fed into the die cavity. To overcome this, in the case of finely powdered materials, such as those having, for example, 200 to 300 mesh, whose consistency is that of flour or talcum powder, the powder is first processed into granules. Such granulation of the material, however, not only adds to its cost and of the finished product but also produces in the finished article a usually objectionable "orange peel" surface instead of a smooth, glossy, even surface obtainable only from the actual use of fine powders in the press. Also, with conventional feeding means, finely powdered material when set in motion flows like water and tends to spill out of the die cavity when the feeder chute is passing over it.

Certain objects of our invention are to provide an improved combination of elements that uniformly and smoothly feeds loose material to a die cavity; that will prevent lumping and clogging of the material during its feeding movement; and that will prevent spilling and waste of finely powdered material as the mouth of the chute passes over the die cavity.

Other objects and advantages will be more apparent to those skilled in the art from the following description of the accompanying drawings in which:

Fig. 1 is an elevational side view of the upper housing of a preform press of the general type referred to embodying my improved feeder means, parts of the press being omitted and a part of the hopper being shown in section for the sake of clarity;

Fig. 2 is an elevational front view of the upper housing of the press and feeder means, with parts of the press being omitted and parts of the feeder housing being shown in section for the sake of clarity;

Fig. 3 is a diagrammatic view of the mechanism for reciprocating the feeder slide;

Fig. 4 is a bottom view of the vertical agitators showing the arrangement of the agitator blades taken on the line 4—4 of Fig. 1;

Fig. 7 is a sectional view of Figs. 5 and 6 taken along the line 7—7 of Fig. 6; and Fig. 8 is a fragmentary perspective of the slot and T connection between the chute and feeder slide.

Figure 5:
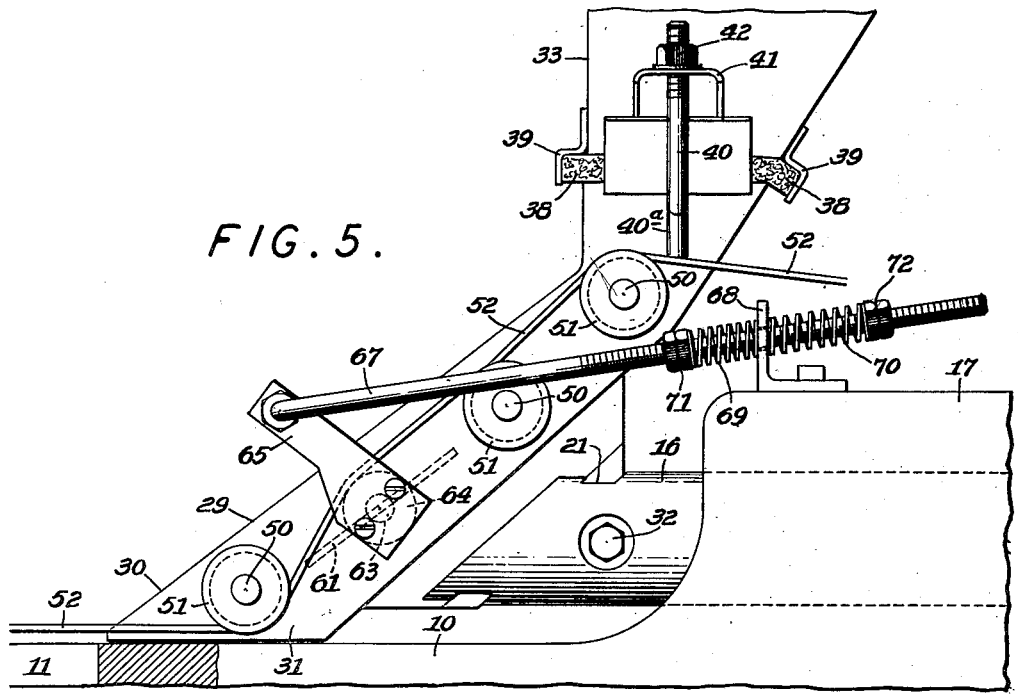
Fig. 5 is a side elevation of the feeder means showing the insertion of splash control means, in place of one of the rotary feeder elements, for controlling the head of material especially when such material is finely powdered.

In the particular embodiment of the invention which is disclosed herein merely for the purpose of illustrating one specific form among possible others that the invention might take in practice, we have shown in Figs. 1 and 2 an upper housing 10 of a preform press of the type disclosed in said Patent No. 2,214,505, in the top of which housing is a conventional die cavity 11 and a lower ram and punch (not shown). The remainder of such press is not shown as it is well known and may be taken as the same as disclosed in said patent. A head 12, carrying a usual upper punch 13 and a ram 13a in alignment with the lower punch, is mounted on and secured to four reciprocable vertical tie rods 14 to cause upper punch 13 to enter and leave die cavity 11 to compress material deposited therein. The usual lower punch discharges the tablet or preform on to a ramp 15 in conventional manner. A feeder slide shaft 16 which is slidably mounted on a covered bracket 17 attached to upper housing 10 is reciprocated horizontally by a bell-crank lever 18, Fig. 3, and cam 19 secured to the main rotating shaft of the press. (See said patent, Fig. 7 thereof, shaft 49.) Lever 18 is pivotally connected to slider shaft 16 by a pin 19a and shifting collar 20 secured to the shaft. A rod 27 connects feeder slide 16 to an air cylinder 28, Fig. 3, which exerts a continuous yielding pressure to move the slide forwardly to the left for keeping arm 18 in contact with cam 19. A feeder chute 29, preferably of rectangular cross section, having a nose 30 and a mouth 31, is removably rigidly secured at an angle to slide 16 by a usual T bar and slot connection 21, Fig. 8, held by a bolt 32. As feeder chute 29 is moved by feeder slide 16 toward the fully advanced position, mouth 31 of the chute comes into communication with die cavity 11, allowing material in the chute to drop into the cavity, and as the chute moves toward the fully retracted position to leave the cavity clear for the descent of head 12 and upper punch 13, mouth 31 is closed by the top surface of housing 10, stopping further delivery of material into the cavity. A hopper 33 is supported over feeder chute 29 and reciprocates therewith by being rigidly connected to slide 16 through a bracket 36. To prevent loss of material by seepage through the juncture of the hopper and chute, a fibrous material, Fig. 7, as, for instance, a strip or strips 38 of felt is inserted between the ends of the hopper and chute and held in place by retainers 39 welded to the four sides of the hopper. The hopper and chute are then rigidly clamped together, Figs. 5 and 6, by threaded studs 40 welded or secured to the sides of the chute at 40a and extending through hopper lugs 41 which are held down rigidly by nuts 42.

To agitate material in the hopper, we provide a number of vertical agitator rods 45 of various lengths supported upon a bracket 43 which in turn is mounted as at 44 upon vertically reciprocating head 12 but which does not have any horizontal movement and hence the agitator rods are in a horizontally fixed position. The rods have a plurality of agitator blades 46 arranged in staggered relationship and, as shown in Fig. 4, at different radial angles to each other. These agitator rods thus have vertical and transverse movements relative to the hopper, the vertical movement being imparted directly by the press head 12 and the relative transverse movement being obtained from slide 16. To feed material through chute 29, we provide, Figs. 6 and 7, elongated U-shaped loops 48 secured to horizontal strips 49 to form rectangular units which are symmetrically mounted on stud shafts or pins 50 at each end. Each pair of shafts 50 extends outwardly beyond bearing openings in each of the side walls of the feeder chute and carry pulleys 51 around which are wound cords 52 preferably of non-elastic material. Each cord has one end attached to a fixed bracket 53 on the stationary press housing 10, and the other end to one end of an overtravel tension spring 54 attached to the stationary feeder slide bracket 17. Each cord is wound around each pulley one or more turns and in such direction as to alternately rotate the pulley, and the oscillatory agitator secured thereto, in opposite directions in response to forward and backward movement of the hopper and chute. If desired, the cords may be so wound that some of the agitators rotate in one direction while simultaneously the remaining agitators rotate in the other direction.

Splash control means for extremely fine powder is also provided in cooperation with the rotary agitators. Such powdered material is almost in a state of fluidity so that if not controlled it will rush out of mouth 31 into die cavity 11 and then "splash" onto the top of housing 10 before feeder chute 29 has been moved forward sufficiently so that mouth 31 completely covers die cavity 11. To suitably control such action, we remove one of the oscillatory agitators, preferably the next to the lowest one, from feeder chute 29, and use in place thereof a splash control plate 61 pivotally mounted on a short shaft 62 and a long shaft 63 journalled in the same bearing openings previously used by the shafts of the replaced oscillatory agitator. Control plate 61 is of such dimensions that it can completely close the chute to passage of material therethrough.

Figure 6:
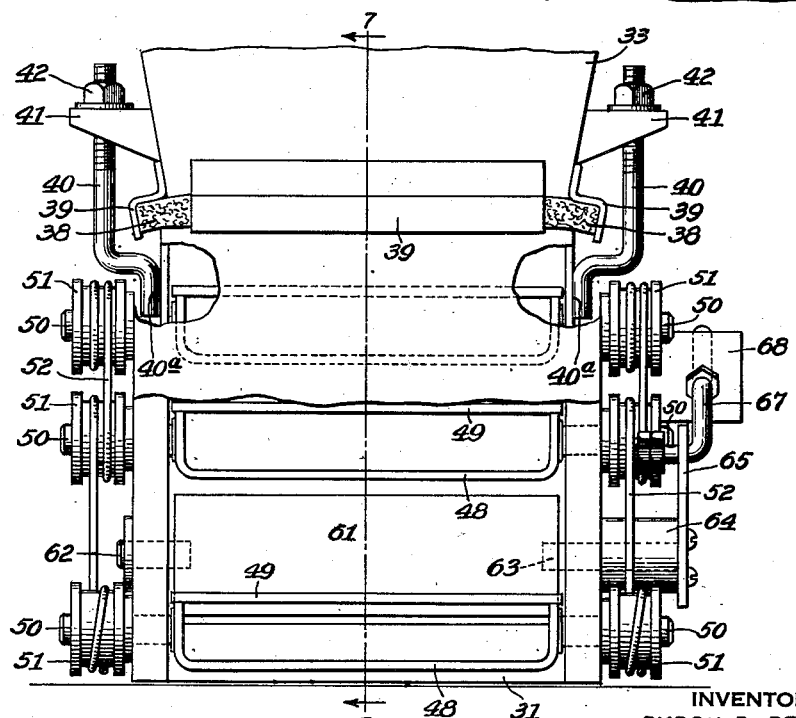
Fig. 6 is a front elevation of Fig. 5 with parts thereof broken away to show details of construction.

To open and close the chute in timed relation to the feeding operation a hub 64, Fig. 6, is secured to shaft 63 and has a lever 65 fixed thereto. Lever 65 is pivotally connected by a link 67 to a stationary bracket 68 on stationary slide housing 17 so that the lever is oscillated upon reciprocation of the chute. To provide for overtravel of the chute, two compression springs 69 and 70 are interposed between the bracket 68 and pairs of nuts 71 and 72 threaded on the link, the link extending freely through the bracket. The cords 52 do not control the plate although the cord on one side is placed, for convenience, to ride over hub 64.

*Operation.*—Assuming that an article has just been formed, the press head moves upwardly during which time the article is ejected from the die cavity 11 whereupon the cam 19, Fig. 3, rotating in timed relation to the head movement, allows the hopper and chute to move forward under the constant pressure of air cylinder 28. This movement sweeps off the ejected article onto ramp 15 and simultaneously brings the discharge end of the feed chute 29 over the die cavity to feed material thereto. Simultaneously with the advance of the feeder chute the agitator rods 45 have their vertical and transverse movement relative to the hopper, and also the oscillatory agitators rotate. As the agitator loops 48 and strips 49 are rotated the material in the feeder chute is stirred up and tumbled about by them, breaking up any tendency of the material to lump or pack down in the feeder chute. As a result the material is uniformly deposited in die cavity 11. The feeder cam 19 when further rotated by crankshaft 25 retracts the hopper which reversely agitates the material in the chute to get the material well advanced preparatory to the next stroke. The die cavity 11 is also left clear for the descent of reciprocating head 12 and upper punch 13 to compress the material deposited in the cavity. With the descent of head 12, bracket 43 also moves downwardly to move vertical agitator rods 45 and blades 46 into and through the material of the hopper, in addition to the transverse movement, to break up any lumps or disposition of the material to pack down in the hopper or at the delivery end thereof. As the press described herein is designed to have a speed range of from 30 to 60 strokes per minute it is seen that the material in both hopper and feeder chute is in a state of continuous movement during the feeding operation and therefore cannot become lumpy or packed down.

When the splash control plate is used, the link 67 and lever 65 opens and closes the plate automatically in timed relation to the feeding operation upon reciprocation of the chute 29 so that the chute is closed when it advances to dotted line position 57, Fig. 1, thereby allowing only the quantity of material in the chute below the plate to fall into die cavity 11. The plate opens the chute as it retracts, thereby to allow material in the upper portion of the chute to fill its lower portion for deposit in the die cavity on the next forward stroke of the chute. The rotary agitators effectively cooperate with the splash plate whether opened or closed, the lower agitator helping to feed material into the die cavity on the forward stroke and the upper agitators helping to fill the chute on the return stroke. As a consequence of our improved splash control there is no uncontrolled rush of material out of mouth 31 into the cavity with the heretofore usual spilling out and waste of material before the mouth of the chute has completely covered the cavity.

From the disclosure herein, it is seen that we have provided a simple, efficient and inexpensive feeder means for tabletting, briquetting or preforming loose material in a press, that utilizes in a novel manner the vertical reciprocatory movement of the head of the press and the horizontal reciprocatory movement of the feeder slide to agitate the material to be fed, both in the hopper and in the feeder chute to prevent lumping and packing down thereof, and, in the case of finely powdered materials that prevents splashing thereof as the feeder chute passes over the die cavity.

It will, of course, be understood by those skilled in the art that various changes may be made in the construction and arrangement of parts without departing from the spirit of the invention as set forth in the appended claims.

We claim:

1. In a press of the type having a housing containing a die cavity, a vertically reciprocating press head with a punch cooperating with the cavity, a hopper and feed chute, and means for moving the hopper and chute in a horizontal direction so as to move the chute over the cavity to supply material thereto and to move the chute away from the cavity to cut off such supply, the combination, comprising, vertically movable agitators disposed in the hopper in a substantially horizontally fixed position so that relative horizontal movement occurs between the agitators and hopper upon horizontal movement of the latter, and means for also vertically moving said agitators whereby material in the hopper is stirred crosswise and vertically.

2. The combination set forth in claim 1 further characterized in that the means for vertically moving the agitators includes a connection of the agitators to the press head so as to be reciprocated thereby.

3. The combination set forth in claim 1 further characterized in that the agitators are rigidly supported by the press head so as to be maintained in their substantially horizontally fixed position and also have vertical movement imparted to them.

4. The combination set forth in claim 1 further characterized by the provision of additional agitators movable about axes, and means for actuating said latter agitators so as to cause flow of material through the chute while the latter is being moved over the cavity to supply material thereto and while material is being agitated within the hopper.

5. The combination set forth in claim 1 further characterized by the provision of agitators movable about axes, and means for actuating said latter agitators so as to cause flow of material through the said chute while the latter is being moved over the cavity to supply material thereto and while material is being agitated within the hopper, said actuating means including mechanism receiving its actuating force from the horizontal movement of the chute whereby the agitation in the hopper and chute is synchronized.

6. In a press of the type having a housing containing a die cavity, a vertically reciprocating press head with a punch cooperating with the cavity, a hopper and feed chute, and means for reciprocating the chute in a horizontal direction so as to move the chute over the cavity to supply material thereto and to move the chute away from the cavity to cut off such supply, the combination, comprising, vertically movable agitators disposed in the hopper, means for supporting said agitators so that relative horizontal movement occurs between the agitators and the hopper upon horizontal movement of the latter, and means for also vertically moving said agitators whereby material in the hopper is stirred crosswise and vertically.

7. In a press of the type having a housing containing a die cavity, a vertically reciprocating press head with a punch cooperating with the cavity, a hopper and feed chute, and means for reciprocating the chute in a horizontal direction so as to move the chute over the cavity to supply material thereto and to move the chute away from the cavity to cut off such supply, the combination, comprising, a rotary agitator disposed within the chute, and mechanism for actuating said agitator by the reciprocating movement of the chute including a pulley on the agitator, a cord extending around said pulley, and stationary means to which both ends of said cord are connected whereby both ends of the cord remain substantially stationary upon reciprocating motion of the chute and the agitator is rotated by the pulley running back and forth along the cord.

8. In a press of the type having a housing containing a die cavity, a vertically reciprocating press head with a punch cooperating with the cavity, a hopper and feed chute, and means for reciprocating the chute in a horizontal direction so as to move the chute over the cavity to supply material thereto and to move the chute away from the cavity to cut off such supply, the combination, comprising, a rotary agitator disposed within the chute, mechanism for actuating said agitator including a pulley on the agitator, a cord extending around said pulley, stationary means to which both ends of said cord are connected whereby both ends of the cord remain substantially stationary upon reciprocating motion of the chute and the agitator is rotated by the pulley running back and forth along the cord, and yieldable means for allowing said cord to accommodate itself to any irregular movements of the chute.

9. In a press of the type having a housing containing a die cavity, a vertically reciprocating press head with a punch cooperating with the cavity, a hopper and feed chute, and means for reciprocating the chute and hopper together in a horizontal direction so as to move the hopper and chute forwardly over the cavity to supply material thereto and to retract the hopper and chute away from the cavity to cut off such supply, the combination, comprising, means disposed within said chute for controlling flow of material from the hopper to the upper part of the chute while allowing flow of material from the lower part of the chute into the die cavity, thereby to minimize splashing of material when it is supplied to the die cavity, and mechanism for operating said splash control means so that during retraction of the chute and hopper material flows freely from the hopper to fill the chute and in the forward position of the chute and hopper the flow of material from the lower end of the chute to the cavity is uncontrolled while flow from the hopper to the chute is controlled.

10. The combination set forth in claim 9 further characterized in that the splash control means comprises a movable member in the chute operable in the forward position of the chute to impede flow of material from the upper portion of the chute while at the same time allowing material to be discharged from the lower portion of the chute into the die cavity.

11. The combination set forth in claim 9 further characterized in that the splash control means comprises a movable member in the chute operable in the forward position of the chute to impede flow of material from the upper portion of the chute while at the same time allowing material to be discharged from the lower portion of the chute into the die cavity, and the operating mechanism has provision for moving said member so that material may be supplied from the hopper to the whole of the chute when retracted from the die cavity.

12. The combination set forth in claim 9 further characterized by the provision of rotary agitating means disposed within the chute to one side of the splash control means.

13. The combination set forth in claim 9 further characterized by the provision of rotary agitating means disposed within the chute beneath the splash control means so that discharge of material into the die cavity is expedited.

14. The combination set forth in claim 9 further characterized by the provision of rotary agitating means disposed within the chute between the splash control means and the hopper so that supply of material to the chute may be expedited in its retracted position.

15. The combination set forth in claim 9 further characterized by the provision of rotary agitating means disposed within the chute between the splash controlling means and hopper so that supply of material to the chute may be expedited in its retracted position, rotary agitating means disposed in the chute below the splash control means so as to expedite discharge of material into the die cavity, and means for simultaneously rotating said agitating means above and below the splash control means whereby all of the agitating means are operative to fill the chute in the retracted position thereof and only a part of the agitating means is operative to discharge material into the die cavity.

16. In a press of the type having a housing containing a die cavity, a vertically reciprocating press head with a punch cooperating with the cavity, a hopper and feed chute, and means for reciprocating the chute in a horizontal direction so as to move the chute forwardly over the cavity to supply material thereto and to retract the chute away from the cavity to cut off such supply, the combination, comprising, means including a rotary element disposed within the chute for closing the passage therethrough so as to minimize spilling of material when it is supplied to the die cavity and for opening the passage to fill the same, and mechanism for operating said spill control means so that during retraction of the chute material flows freely from the hopper to fill the entire chute and in the forward position of the chute only a part of the material in the chute flows to the cavity, said operating mechanism includes a lever connected to the rotary element and a link connecting the lever to a stationary part of the press whereby upon reciprocation of the chute the rotary element is automatically closed or opened in accordance with the position of the chute.

BYRON B. BELDEN.
KEITH W. HALL.

REFERENCES CITED

The following references are of record in the file of this patent:

UNITED STATES PATENTS

| Number | Name | Date |
| --- | --- | --- |
| 456,656 | Leavitt | July 28, 1891 |
| 759,259 | Flood | May 10, 1904 |
| 1,139,971 | Heckert | May 18, 1915 |
| 1,982,576 | Derry | Nov. 27, 1934 |
| 2,094,618 | Pridham | Oct. 5, 1937 |
| 2,214,505 | Magnenat | Sept. 10, 1940 |
| 2,256,081 | Farley | Sept. 16, 1941 |
| 2,317,823 | Strauss | Apr. 27, 1943 |
| 2,386,891 | Gregory, Jr. | Oct. 16, 1945 |